(12) United States Patent
Winslow et al.

(10) Patent No.: US 9,535,811 B2
(45) Date of Patent: Jan. 3, 2017

(54) AGENT DYNAMIC SERVICE

(71) Applicant: AppDynamics, Inc., San Francisco, CA (US)

(72) Inventors: Brad Winslow, San Francisco, CA (US); Anthony Kilman, San Francisco, CA (US)

(73) Assignee: AppDynamics, Inc., San Fransisco, CA (US)

(*) Notice: Subject to any disclaimer, the term of this patent is extended or adjusted under 35 U.S.C. 154(b) by 29 days.

(21) Appl. No.: 14/530,436

(22) Filed: Oct. 31, 2014

(65) Prior Publication Data
US 2016/0124829 A1  May 5, 2016

(51) Int. Cl.
G06F 3/00 (2006.01)
G06F 9/44 (2006.01)
G06F 11/30 (2006.01)
G06F 9/54 (2006.01)
G06F 11/34 (2006.01)

(52) U.S. Cl.
CPC ............ *G06F 11/3003* (2013.01); *G06F 8/30* (2013.01); *G06F 9/54* (2013.01); *G06F 11/3093* (2013.01); *G06F 11/3466* (2013.01); *G06F 2201/815* (2013.01); *G06F 2201/865* (2013.01)

(58) Field of Classification Search
CPC ..................................... G06F 9/54; G06F 8/30
USPC ........................................... 719/310; 717/106
See application file for complete search history.

(56) References Cited

U.S. PATENT DOCUMENTS

| 5,958,010 A | 9/1999 | Agarwal |
| 6,026,237 A | 2/2000 | Berry et al. |
| 6,125,382 A | 9/2000 | Brobst et al. |
| 6,336,148 B1 | 1/2002 | Doong et al. |
| 6,336,213 B1 | 1/2002 | Beadle et al. |
| 6,470,494 B1 * | 10/2002 | Chan ............. G06F 9/445 717/139 |
| 6,477,666 B1 | 11/2002 | Sanchez et al. |
| 6,493,816 B1 | 12/2002 | Munroe |
| 6,651,108 B2 | 11/2003 | Popp |
| 6,662,359 B1 | 12/2003 | Berry et al. |
| 7,054,361 B1 | 5/2006 | Otte et al. |

(Continued)

FOREIGN PATENT DOCUMENTS

| GB | 2 518 739 | 4/2015 |
| WO | WO 2015/058204 | 4/2015 |
| WO | 2016069040 A1 | 5/2016 |

OTHER PUBLICATIONS

Manfred Dalmeijer, A Reliable Mobile Agents Architecture, 1998.*
(Continued)

*Primary Examiner* — Lechi Truong
(74) *Attorney, Agent, or Firm* — Bachmann Law Group

(57) ABSTRACT

A dynamic service module is embedded in an agent and able to add functionality to the agent. The service module may manage .jar files for execution by the agent. The service module may receive the .jar files, provide them to an agent for execution, and may perform other functions. The agent may perform obfuscation in order to translate the .jar files into a modified version which may be more compatible with a particular agent. Once execution of the .jar file is complete, the agent may remove the .jar file as well as all trace of the .jar file. For example, the agent may remove byte code instrumentation that was installed as a result of the .jar file.

25 Claims, 5 Drawing Sheets

(56) References Cited

U.S. PATENT DOCUMENTS

| | | | |
|---|---|---|---|
| 7,367,025 B1 | 4/2008 | Nikolov et al. | |
| 7,587,487 B1 | 9/2009 | Gunturu | |
| 7,957,934 B2 | 6/2011 | Greifeneder | |
| 8,151,277 B2 | 4/2012 | Greifeneder et al. | |
| 8,248,958 B1 | 8/2012 | Tulasi et al. | |
| 8,312,249 B1 | 11/2012 | Trumbell | |
| 8,676,901 B1* | 3/2014 | Nicolaou | H04L 51/08 709/203 |
| 8,863,093 B1 | 10/2014 | Chou et al. | |
| 8,914,626 B1 | 12/2014 | Adogla et al. | |
| 8,965,952 B1 | 2/2015 | Shatalin et al. | |
| 2001/0034016 A1 | 10/2001 | Ziv-el et al. | |
| 2002/0018481 A1 | 2/2002 | Mor et al. | |
| 2002/0173997 A1 | 11/2002 | Menard et al. | |
| 2002/0174174 A1* | 11/2002 | Ramraj | H04L 67/34 709/203 |
| 2003/0014549 A1* | 1/2003 | Seidman | H04L 29/06 719/310 |
| 2003/0093551 A1 | 5/2003 | Taylor et al. | |
| 2004/0006620 A1 | 1/2004 | Howard et al. | |
| 2004/0031020 A1 | 2/2004 | Berry et al. | |
| 2004/0039728 A1 | 2/2004 | Fenlon | |
| 2004/0081183 A1 | 4/2004 | Monza | |
| 2004/0153825 A1 | 8/2004 | Morimoto et al. | |
| 2005/0033767 A1* | 2/2005 | Kamentz | G06F 9/44536 |
| 2005/0039190 A1 | 2/2005 | Rees et al. | |
| 2005/0091376 A1 | 4/2005 | Helfman | |
| 2005/0155024 A1* | 7/2005 | Wannamaker | G06F 8/4434 717/151 |
| 2005/0165584 A1 | 7/2005 | Boody et al. | |
| 2005/0243837 A1 | 11/2005 | Boyd et al. | |
| 2005/0264581 A1 | 12/2005 | Patrick et al. | |
| 2005/0273709 A1 | 12/2005 | Lough et al. | |
| 2005/0281259 A1 | 12/2005 | Mitchell | |
| 2006/0041539 A1 | 2/2006 | Matchett et al. | |
| 2006/0059092 A1 | 3/2006 | Burshan et al. | |
| 2006/0072568 A1 | 4/2006 | Vaananen | |
| 2006/0155803 A1* | 7/2006 | Muramatsu | H04L 67/303 709/203 |
| 2006/0168526 A1 | 7/2006 | Stirbu | |
| 2006/0271395 A1 | 11/2006 | Harris | |
| 2006/0280181 A1 | 12/2006 | Brailas et al. | |
| 2007/0027742 A1 | 2/2007 | Emuchay et al. | |
| 2007/0067364 A1 | 3/2007 | Barbian et al. | |
| 2007/0088668 A1 | 4/2007 | Larab et al. | |
| 2007/0180227 A1 | 8/2007 | Akimoto | |
| 2008/0062993 A1 | 3/2008 | Levy et al. | |
| 2008/0098378 A1 | 4/2008 | Kilbane et al. | |
| 2008/0225748 A1 | 9/2008 | Khemani et al. | |
| 2008/0304518 A1 | 12/2008 | Cheng et al. | |
| 2009/0320030 A1 | 12/2009 | Ogasawara | |
| 2010/0088404 A1 | 4/2010 | Mani et al. | |
| 2010/0100890 A1 | 4/2010 | Dar | |
| 2010/0138703 A1 | 6/2010 | Bansal et al. | |
| 2010/0162204 A1 | 6/2010 | Baumann et al. | |
| 2010/0199259 A1 | 8/2010 | Quinn et al. | |
| 2010/0287541 A1 | 11/2010 | Saunders et al. | |
| 2011/0222412 A1 | 9/2011 | Kompella | |
| 2011/0252395 A1 | 10/2011 | Charisius et al. | |
| 2011/0276683 A1 | 11/2011 | Goldschlag et al. | |
| 2011/0305160 A1 | 12/2011 | Green et al. | |
| 2012/0005166 A1 | 1/2012 | Pace et al. | |
| 2012/0047276 A1 | 2/2012 | Lindquist et al. | |
| 2012/0047494 A1 | 2/2012 | Unrein et al. | |
| 2012/0167057 A1 | 6/2012 | Schmich et al. | |
| 2012/0230225 A1 | 9/2012 | Matthews et al. | |
| 2012/0297371 A1 | 11/2012 | Greifeneder et al. | |
| 2012/0304172 A1 | 11/2012 | Greifeneder et al. | |
| 2013/0067074 A1 | 3/2013 | Allen et al. | |
| 2013/0117132 A1 | 5/2013 | Padwal et al. | |
| 2014/0059527 A1 | 2/2014 | Gagliardi | |
| 2014/0059528 A1 | 2/2014 | Gagliardi | |
| 2014/0283040 A1 | 9/2014 | Wilkerson et al. | |
| 2015/0067146 A1 | 3/2015 | Raker | |
| 2015/0113122 A1 | 4/2015 | Sunkara | |
| 2015/0124840 A1 | 5/2015 | Bergeron | |
| 2016/0124832 A1 | 5/2016 | Kumar et al. | |

OTHER PUBLICATIONS

U.S. Appl. No. 14/530,663, filed Oct. 31, 2014, Pankaj Kumar, Monitoring and Correlating a Binary Process in a Distributed Business Transaction.

U.S. Appl. No. 14/609,298, filed Jan. 29, 2015, Vinay Srinavasaiah, Dynamic Agent Delivery.

PCT Application No. PCT/US2014/061402 International Search Report and Written Opinion dated Jan. 21, 2015.

United Kingdom Application No. GB1413464.7, Search Report dated Jan. 27, 2015.

U.S. Appl. No. 14/530,633 Office Action mailed Mar. 12, 2015.

Czajkowski et al., "Jres: A Resource Accounting Interface for Java", 1998.

Dmitriev, "Profiling Java Application Using Code Hotswapping and Dynamic Call Graph Revelation", 2004.

U.S. Appl. No. 14/018,349 Office Action mailed Jan. 22, 2016.

U.S. Appl. No. 14/018,349 Office Action mailed Sep. 11, 2015.

U.S. Appl. No. 14/058,200 Office Action mailed Feb. 1, 2016.

U.S. Appl. No. 14/058,200 Third-Party Submission mailed May 20, 2015.

U.S. Appl. No. 14/530,633 Office Action mailed Jun. 12, 2015.

U.S. Appl. No. 14/530,633 Office Action mailed Oct. 6, 2015.

U.S. Appl. No. 14/609,298 Office Action mailed Jul. 17, 2015.

Gregersen et al., "Javeleon: An Integrated Platform for Dynamic Software Updating and its Application in Self-Systems", 2012.

PCT Application No. PCT/US2015/013873 International Search Report and Written Opinion dated Jun. 9, 2015.

\* cited by examiner

AGENT DYNAMIC SERVICE

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Agents are often utilized by application monitoring systems to monitor an application, collect data, and report the data. These agents are usually software that are static in nature. Once created, the agents are installed and are usually not changed. In the rare situation where an agent does need to be changed, it usually requires restarting the java virtual machine on which the agent resides.

What is needed is an improved system for updating an agent while minimizing the effect on the underlying code being monitored.

SUMMARY

The present technology includes a dynamic service module embedded in an agent which is able to add functionality to the agent. The service module may manage .jar files for execution by the agent. The service module may receive the .jar files, provide them to an agent for execution, and may perform other functions. The agent may perform obfuscation in order to translate the .jar files into a modified version which may be more compatible with a particular agent. Once execution of the .jar file is complete, the agent may remove the .jar file as well as all trace of the .jar file. For example, the agent may remove byte code instrumentation that was installed as a result of the .jar file.

An embodiment may include a method for monitoring an application. A first .jar file is received by an agent within an application on a server. A new .jar file is created from the received .jar file to modify references to agent elements. The new .jar file is then run. The new .jar file and code created by the new .jar file by the service module.

An embodiment may include a system for monitoring a business transaction. The system may include a processor, a memory and one or more modules stored in memory and executable by the processor. When executed, the one or more modules may receive a first .jar file by an agent within an application on a server, create a new .jar file from the received .jar file to modify references to agent elements, run the new .jar file, and remove the .jar file and code created by the .jar file by the service module.

DETAILED DESCRIPTION

The present technology includes a dynamic service module embedded in an agent which is able to add functionality to the agent. The service module may manage .jar files for execution by the agent. The service module may receive the .jar files, provide them to an agent for execution, and may perform other functions. The agent may perform obfuscation in order to translate the .jar files into a modified version which may be more compatible with a particular agent. Once execution of the .jar file is complete, the agent may remove the .jar file as well as all trace of the .jar file. For example, the agent may remove byte code instrumentation that was installed as a result of the .jar file.

Figure 1:
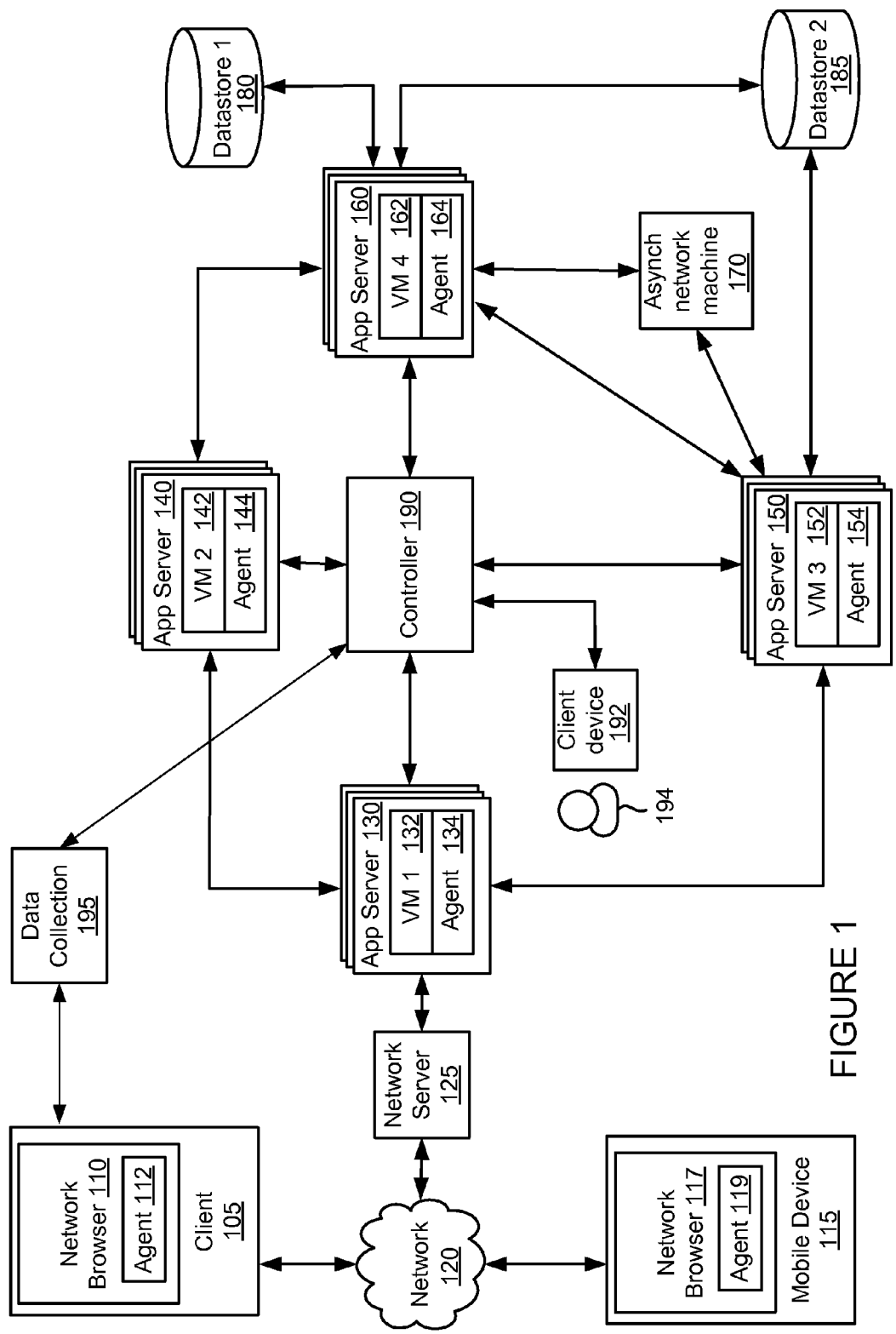
FIG. 1 is a block diagram of a system for modifying an agent within an application monitoring system.

FIG. 1 is a block diagram of a system for correlating application performance data and machine health data. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Application servers may or may not include virtual machines. For example, a .NET application server may not include a virtual machine and may be used in place of any application server 130-160 in the system of FIG. 1. References to a virtual machine for each application server are intended to be for exemplary purposes only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
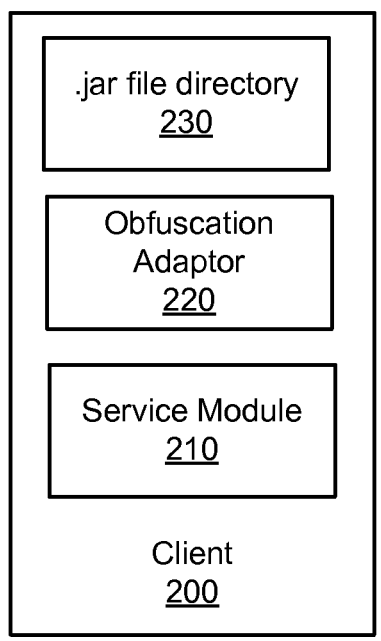
FIG. 2 is a block diagram of an agent.

FIG. 2 is a block diagram of an agent. Agent 200 of FIG. 2 may include a service module 210, obfuscation adopter 220, and a .jar file directory 230. The service module 210 may receive .jar files from a remote location, such as a controller or from an administrator's machine, and run the .jar files through the obfuscation adopter. The obfuscation adopter may create a new .jar file from the receive .jar file based on one or more keys which are accessible to the adopter. The keys may indicate what agent methods, classes, fields, and other dimensions should be modified from the originally received .jar file. Once the .jar file has gone through the obfuscation adopter, the .jar file is placed in the .jar file directory 230. Agent 200 may detect the .jar files newly placed in the .jar file directory, execute the newly placed .jar file, and then clean up the .jar file and any trace it leaves in the agent or the application being monitored by the agent. For example, the agent may remove any byte code instrumentation left from execution of the .jar file.

Figure 3:
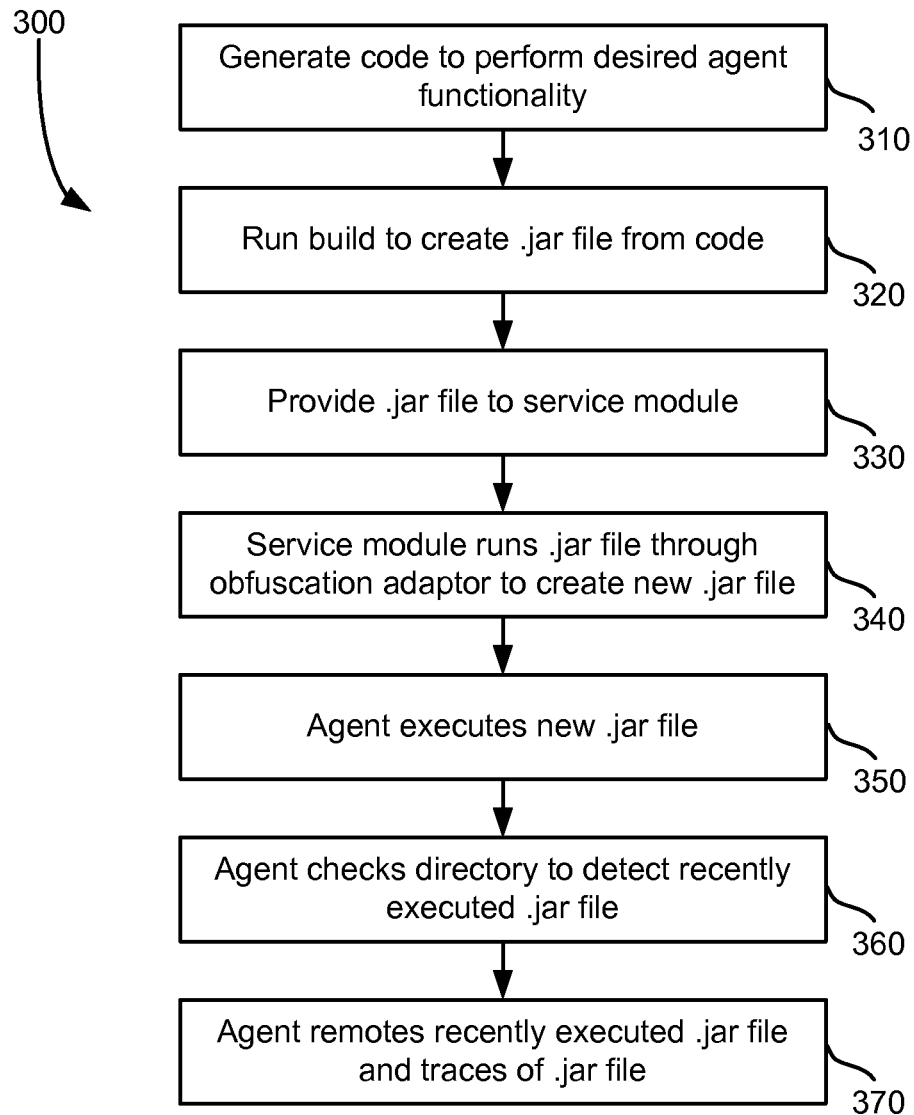
FIG. 3 is a method for dynamically modifying an agent.

FIG. 3 is a block diagram of a method 300 for dynamically modifying an agent. First, code is generated to perform functionality at step 310. The functionality may be anything desired of the agent. Examples of coded functionality may include generic interceptor insertion via BCI, specifying match conditions, tracing I/O activity over network sockets, scanning threads for activity, locate and examine class loaders, and so on. Once the code is generated, a build may be run to create a .jar file from the code at step 320. This may be done by any code building software.

The .jar file is provided to a service module at step 330. The .jar file may be provided to a service module manually or by a remote server, such as for example a controller. The service module runs a .jar file through the obfuscation adopter to create a new .jar file at step 340. The new .jar file may be generated based on a key that maps classes, methods, and fields in the received .jar file to what is actually used in the agent. In some instances, this may be required if the agent classes, methods or fields are obfuscated.

The agent then executes the new .jar file at step 350. Executing the new .jar file may include placing the .jar file in a directory, loading the .jar file from the directory and executing the .jar file by the agent. More details for executing a .jar file are discussed with respect to the method of FIG. 4.

The agent may check the .jar file directory to detect recently executed .jar files at step 360. Recently executed .jar files may be identified based on time stamps of execution or time stamps of loading into the .jar file directory. In some embodiments, the agent may keep track of recently executed .jar files and remove .jar files after subsequently looking for them in the directory. If an agent detects a .jar file that was previously executed, the agent removes that executed .jar file as well as any trace of the .jar file at step 370. Traces of the .jar file may include instrumented byte code and other content.

Figure 4:
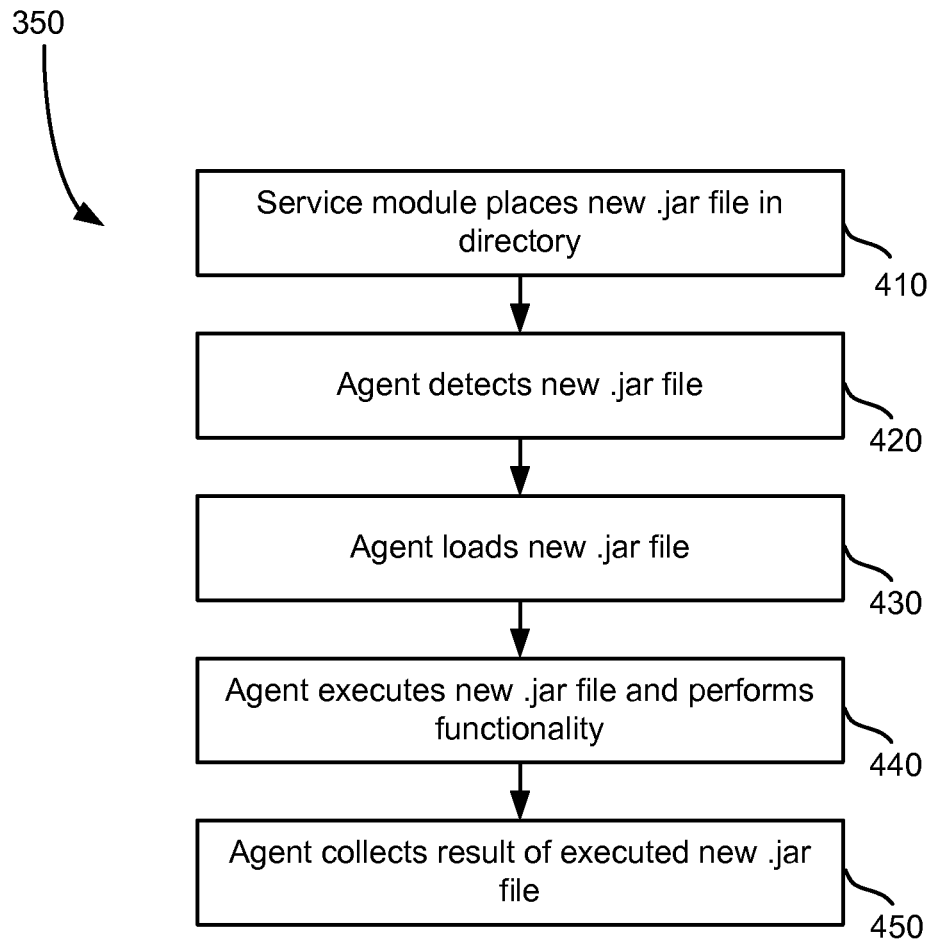
FIG. 4 is a method for executing a .jar file by an agent.

FIG. 4 is a method for executing a .jar file by an agent. The method of FIG. 4 provides more detail for step 350 of the method of FIG. 3. First, the service module may place a new .jar file in the .jar file directory at step 410. Once the .jar file is in the directory, the .jar file will be detected by the agent at step 420. In some instances, the agent may periodically check the .jar file directory for new files. In some instances, the agent may check the .jar file directory based on another event. Once the agent detects a new .jar file, the agent loads the new .jar file at step 430 and executes the new .jar file at step 440. Upon executing the new .jar file, the agent performs the functionality that was coded at step 310 in the method of FIG. 3. The functionality may be any capability of the agent and reach to any portion of an application accessible by the agent. The agent collects the result of the executed new .jar file at step 450. For example, the agent may determine a response time of a call, return value of a call, or other result information.

Figure 5:
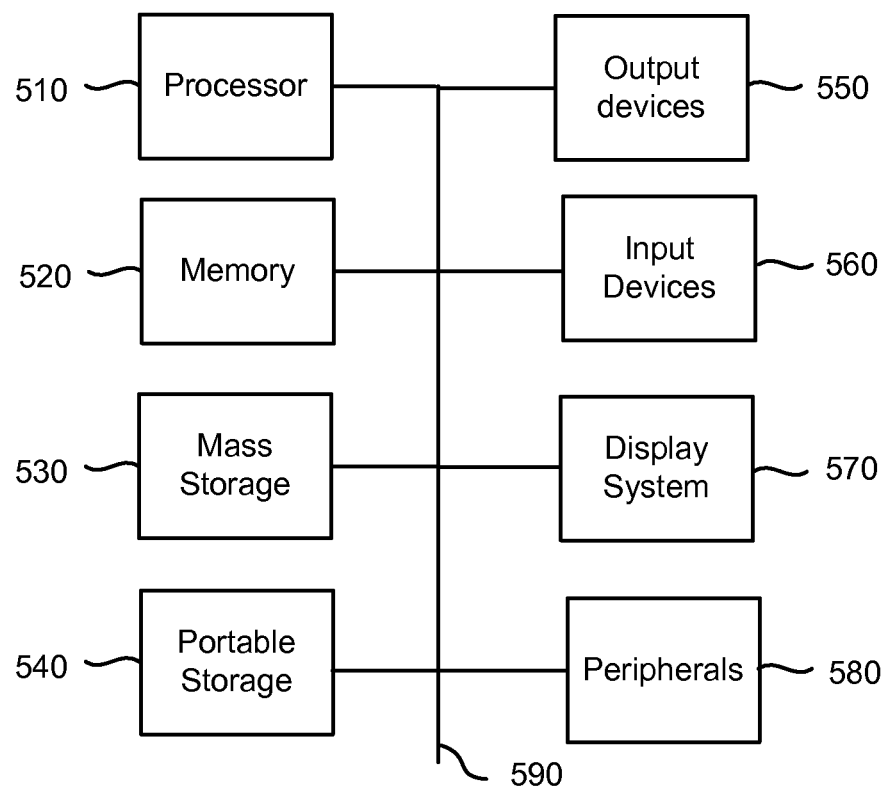
FIG. 5 is a block diagram of a computing environment for use with the present technology.

FIG. 5 is a block diagram of a computing environment for implementing the present technology. System 500 of FIG. 5 may be implemented in the contexts of the likes of clients 105 and 192, network server 125, application servers 130-160, controller 190, and data stores 180-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include an LED, liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an application, comprising:
    receiving, by a service module embedded in an agent installed on a server for monitoring an application, a .jar file;
    creating a new .jar file by modifying references to agent elements found in the received .jar file and including modified references to agent elements obtained through the modifying in the new .jar file;
    executing the new .jar file with the modified references to agent elements;
    detecting the executed new .jar file based on a time stamp indicative of the executing of the new jar file; and
    removing the executed new .jar file detected based on the time stamp and traces of the executed new .jar file;

wherein using an obfuscation adaptor includes using the obfuscation adaptor to perform the modifying of the references to agent elements found in the received .jar file including references to agent classes, methods and fields.

2. The method of claim 1, wherein creating the new .jar file includes using an obfuscation adaptor.

3. The method of claim 1, wherein using the obfuscation adaptor includes using one or more keys that indicate the modifying of the references to agent elements found in the received .jar file including modifying references to agent classes, methods and fields found in the received .jar to what is used in the agent.

4. The method of claim 1, wherein executing the new .jar file includes placing the new .jar file in a .jar file directory.

5. The method of claim 4, wherein removing the executed new .jar file includes removing the executed new .jar file from the .jar file directory; and
wherein removing the traces of the new .jar file includes removing byte instrumented code generated as a result of executing the new .jar file.

6. The method of claim 1, including:
performs, by the agent, a functionality responsive to the executing the new .jar file.

7. The method of claim 6, the received .jar file is indicative of the functionality to be performed by the agent.

8. The method of claim 7, wherein the functionality to be performed by the agent include generic interceptor insertion, specifying match conditions, tracing I/O activity over network sockets, scanning threads for activity, or locating and examining class loaders.

9. The method of claim 1, wherein receiving the .jar file includes receiving the .jar file from a remote server.

10. A non-transitory computer readable storage medium having embodied thereon a program, the program being executable by a processor to perform a method for monitoring an application, the method comprising:
receiving, by a service module embedded in an agent installed on a server for monitoring an application, a .jar file;
creating a new .jar file by modifying references to agent elements found in the received .jar file and including modified references to agent elements obtained through the modifying in the new .jar file;
executing the new .jar file with the modified references to agent elements;
detecting the executed new .jar file based on a time stamp indicative of the executing of the new jar file; and
removing the executed new .jar file detected based on the time stamp and traces of the executed new .jar file;
wherein using the obfuscation adaptor includes using the obfuscation adaptor to perform the modifying of the references to agent elements found in the received .jar file including references to agent classes, methods and fields.

11. The non-transitory computer readable storage medium of claim 10, wherein creating the new .jar file includes using an obfuscation adaptor.

12. The non-transitory computer readable storage medium of claim 10, wherein using the obfuscation adaptor includes using one or more keys that indicate the modifying of the references to agent elements found in the received .jar file including modifying references to agent classes, methods and fields found in the received .jar to what is used in the agent.

13. The non-transitory computer readable storage medium of claim 10, wherein executing the new .jar file includes placing the new .jar file in a .jar file directory.

14. The non-transitory computer readable storage medium of claim 10, wherein removing the executed new .jar file includes removing the executed new .jar file from the .jar file directory; and
wherein removing the traces of the new .jar file includes removing byte instrumented code generated as a result of executing the new .jar file.

15. The non-transitory computer readable storage medium of claim 10, including:
performing, by the agent, a functionality responsive to the executing the new .jar file.

16. The non-transitory computer readable storage medium of claim 15, wherein the functionality to be performed by the agent include generic interceptor insertion, specifying match conditions, tracing I/O activity over network sockets, scanning threads for activity, or locating and examining class loaders.

17. The non-transitory computer readable storage medium of claim 10, wherein receiving the .jar file includes receiving the .jar file from a remote server.

18. A system for monitoring an application, including:
a processor;
a memory; and
one or more modules stored in the memory and executable by the processor to cause operations including:
a service module embedded in an agent installed on a server for monitoring an application to receive a .jar file;
the service module to create a new .jar file by modifying references to agent elements found in the received .jar file and include modified references to agent elements obtained through the modifying in the new .jar file;
the agent to execute the new .jar file with the modified references to agent elements;
the agent to detect the executed new .jar file based on a time stamp indicative of the executed new .jar file; and
the agent to remove the executed new .jar file detected based on the time stamp and traces of the executed new .jar file;
wherein using the obfuscation adaptor includes using the obfuscation adaptor to perform the modifying of the references to agent elements found in the received .jar file including references to agent classes, methods and fields.

19. The system of claim 18, wherein the agent includes an obfuscation adaptor to create the new .jar file.

20. The system of claim 18, wherein the references to agent include references to agent classes, methods and fields.

21. The system of claim 18, wherein the new .jar file is in a .jar file directory.

22. The system of claim 21, wherein the new .jar file in the .jar file directory has a unique name.

23. The system of claim 18, wherein the traces of the new .jar file include instrumented code generated as a result of executing the new .jar file.

24. The system of claim 18, wherein the agent is configured to perform a functionality responsive to the new .jar file being executed.

25. The system of claim 24, wherein the functionality to be performed by the agent include generic interceptor insertion, specifying match conditions, tracing I/O activity over network sockets, scanning threads for activity, or locating and examining class loaders.

\* \* \* \* \*